INVENTORS
CHARLES L. SHIRLEY, JR.
RUSSELL J. KELLY

FIG. 2-A

INVENTORS
CHARLES L. SHIRLEY, JR.
RUSSELL J. KELLY

BY Richard J. Seligman

ATTORNEY

INVENTORS
CHARLES L. SHIRLEY, JR.
RUSSELL J. KELLY
BY Richard J. Seligman
ATTORNEY

United States Patent Office 3,495,687
Patented Feb. 17, 1970

3,495,687
DEPLOYABLE BOOM
Charles L. Shirley, Jr., Peabody, Mass., and Russell J. Kelly, Nashua, N.H., assignors to Sanders Associates, Inc., Nashua, N.H., a corporation of Delaware
Filed Mar. 7, 1967, Ser. No. 621,309
Int. Cl. B66b 9/00, 11/06
U.S. Cl. 187—1
10 Claims

ABSTRACT OF THE DISCLOSURE

This invention relates to booms capable of being extended and retracted and, more particularly, to deployable booms fabricated of volute spring type structural members, which members are controlled by mechanical and electrical means consisting of motors, rotating drums, shafts and gear mechanisms.

Background of invention

Devices exist which can be used as deployable booms, but in many cases undesirable qualities such as bulkiness, weight and cost have precluded their proper commercial and military development. Another undesirable quality that is commonly found in such earlier devices is the failing wherein once the device is extended, retraction is impossible. Some prior art devices are also unable to withstand any forces placed thereon, and thus cannot be used for carrying sundry loads.

Recognition of the commercial and military needs and desires with regard to booms in general resulted in the conclusion that a more flexible device was necessary for the multiplicity of pertinent applications. Such a deployable boom should overcome the weaknesses heretofore stated and eliminate such disadvantages as bulkiness, weight and high cost by providing a compact and lightweight unit which can be extended and retracted via control means which are capable of being externally exercised.

At the same time, this new and improved device should possess the capability of supporting large loads.

This new device should also be capable of operation in a non-gravity environment thereby allowing for use in space, an example being that of an antenna.

Summary

The instant invention eliminates the disadvantages heretofore stated with regard to earlier devices. This invention involves a volute spring mounted on a platform such that the larger end of the spring is free to change diameter but is restricted from rotation. To the top and smaller end of the volute spring is mounted a tie plate which supports any desired loads to be elevated. A flexible shaft is coupled to the tie plate and extends the full length of the boom to a rotating drum at the base of the volute spring. A motor is attached to the flexible shaft to supply rotational torque to the tie plate allowing for a smooth extension and retraction of the spring, and further allowing for locking once extension is accomplished. A second motor is attached to the rotating cable drum and controls the rate of extension, and is also used to effect retraction. Also provided is a clamp arrangement located at the base of the volute spring which serves to restrict the diameter of the spring. This restriction is necessary to support large axial loads.

This invention also contemplates the use of dual volute spring type booms mutually controlled and interrelated, generally operating in the same manner as that of a single volute spring boom.

It is the principal object of this invention to provide a deployable boom capable of being extended and retracted.

It is another object of this invention to provide such a boom possessing the capability of supporting large loads.

It is a further object of this invention to provide a deployable boom, comprising a volute spring structural member, with means for locking the boom upon extension.

It is still another object of this invention to provide means for harnessing a multiplicity of volute spring structural members resulting in a deployable boom possessing the objects set forth hereinabove.

It is yet still another object of this invention to provide a deployable boom capable of operation in space for carrying loads or for use as an extendable and retractable antenna.

Brief description of drawings

Other features and objects of this invention will become more apparent by reference to the description which follows, taken in conjunction with the accompanying drawings, in which:

FIGURE 2A is a cross-section view of a stationary retaining clip taken along section A—A of FIGURE 2.

Description of preferred embodiments

This invention makes use of volute spring structural members and their associated physical properties. Volute springs and their characteristics have existed and have been recognized for some time, but will be briefly discussed herein in order that a better understanding may be had of the manner in which this invention harnesses and controls said characteristics.

Volute springs are springs wound from flat material on a tapered mandrel resulting in the formation of a tapered cylinder consisting of an almost continuous series of coils. Externally applied axial forces will cause these spring coils to slide within each other lengthwise, thus causing the cylinder to become shortened. On the other hand, internally applied axial forces tend to make the tapered cylinder become longer. It it to be noted that the natural configuration of a volute spring is that of its fully extended position.

For freeness of action of the coils, a clearance is built in between each coil during fabrication of the spring which thereby reduces the possible existence of friction to a minimum.

If, in the extended condition of the volute spring, this clearance is reduced to substantially zero, the respective coils will tightly grip each other, with the result that the overall spring becomes extremely rigid, and is thereby capable of supporting axial and side loads in the same manner as would a homogeneous post. This clearance can be reduced to zero by simply twisting the volute spring about its own axis, while restraining one end, thus causing each coil diameter to become smaller until it grips the adjacent coil. Thus, an extended volute spring can be made to be used as a tube by "winding" it up. Conversely, by "unwinding" the spring the clearances between the coils are increased and any axial force will cause the coils to slide into each other until the overall spring becomes a cylinder whose length is equal to the volute spring stock width.

As the volute spring becomes shorter, the base diameter increases; and as the volute spring is allowed to become longer, said base diameter decreases. Therefore, it is to be noted that a volute spring can be made to withstand large axial loads when extended by appropriate restriction of the base diameter from increasing.

Figure 1:
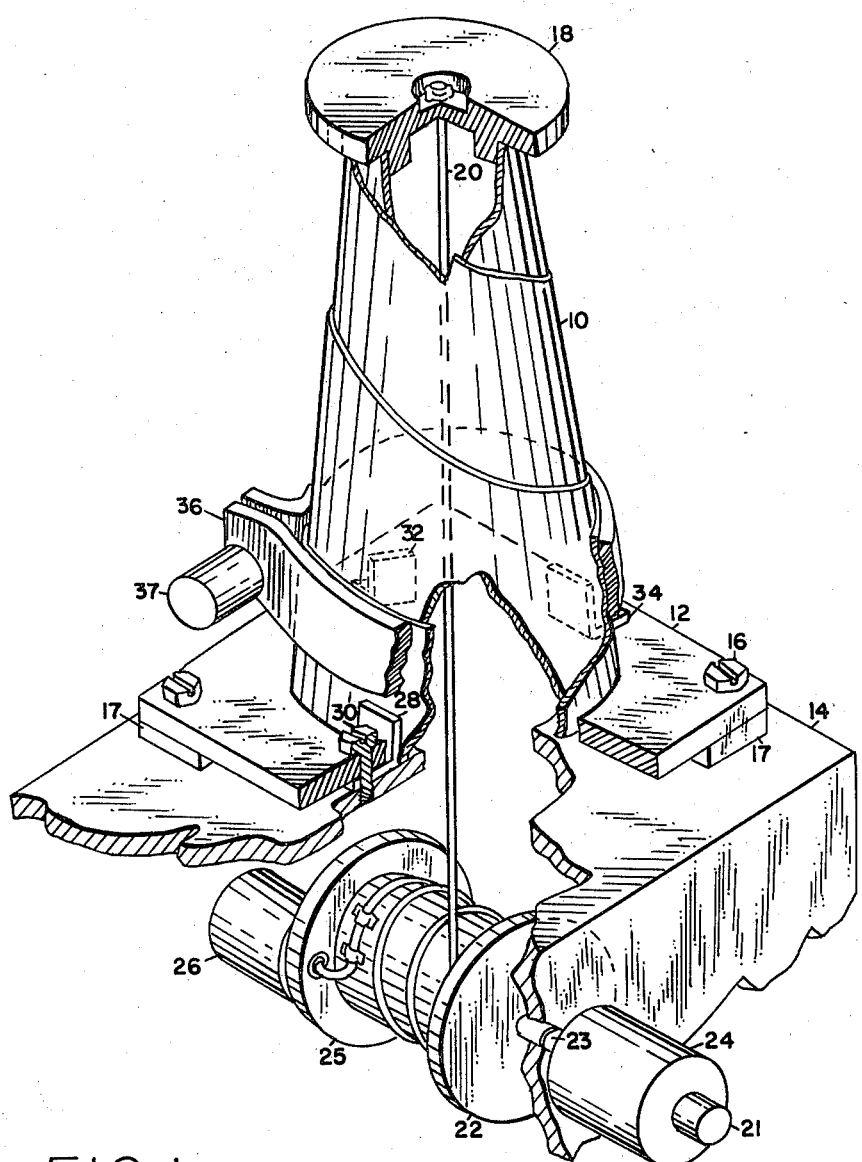
FIGURE 1 is a perspective view illustrating a deployable boom, portions of which are broken away in order to expose internal details.
Figure 2:
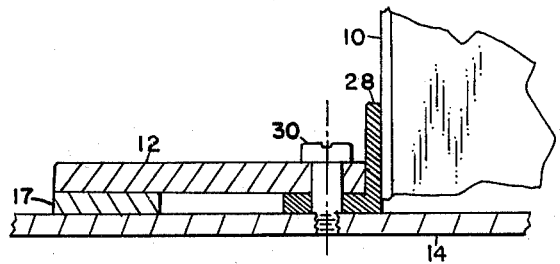
FIGURE 2 is a plan view of a single volute of a deployable boom.
Figure 2:
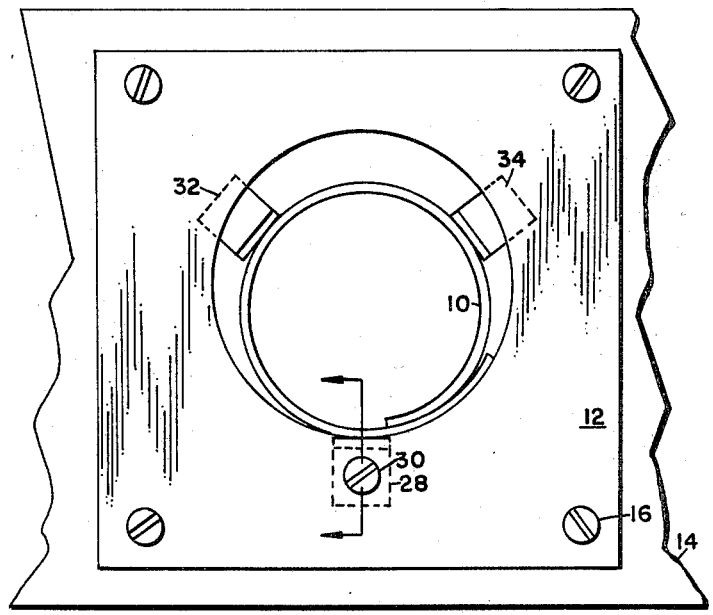

Refer now to FIGURES 1 and 2, wherein is shown a single volute spring deployable boom. The volute spring 10 fits within a circular opening existing on a retainer plate 12. Retainer plate 12 is mounted to a boom support 14 in an elevated manner using, for example, screws 16 and shims 17. To the top and smaller end of volute spring 10 is connected a tie plate 18 upon which loads may be attached in a conventional manner. To this tie plate is connected a flexible shafting 20 which proceeds through the center of the volute spring 10 towards a rotatable drum 22 upon which it is then wrapped.

Attached to this rotatable drum 22 by shaft 23 is an extend-and-retract motor 24. Another motor, lock-and-release motor 26, is eccentrically connected to a flange 25 of drum 22, with the result that both the motor 26 and drum 22 rotate with shaft 23. The shaft of lock-and-release motor 26 is connected to the other end of flexible shaft 20 for driving same, as shown in FIGURE 1.

Means for mounting drum 22, and motors 24 and 26 to support 14 are conventional and not shown.

Assume that the deployable boom shown in FIGURE 1 is in its retracted position. In order for extension to occur as shown in FIGURE 1, employment of extend-and-retract motor 24 causes rotatable drum 22 to rotate in such a manner as to unwind the flexible shafting 20 wrapped thereupon.

Since the natural position of the volute spring 10 is that of its extended condition, as flexible shaft 20 unwinds, the natural axial forces of volute spring 10 will cause the volute spring to extend. Extend-and-retract motor 24, in conjunction with flexible shafting 20, controls the rate or speed of extension.

It is important that a smooth and friction-free deployment of the boom be made to occur. This means that a constant clearance must be maintained between the individual coil-like sections of the volute spring 10. This is accomplished by use of a second motor, lock-and-release motor 26, which transmits a rotational torque to tie plate 18. Motor 26 is directly connected to flexible shafting 20. The flexible shafting 20 used in this invention is conventional and consists of an outer casing wrapped around dual counterwound spring-like shafting which causes appropriate torque transmission from motor 26 to be applied at tie plate 18. The tie plate 18 turns as a result of applying this torque. This means that the clearance necessary between the coil-like portions of volute spring 10 is maintained during extension, and this further results in the whole boom exhibiting a high degree of rigidity.

It is to be noted that lock-and-release motor 26 may be manually started by conventional switching means. There also exists the possibility of timing the two motors 24 and 26 so that each motor could either lead or lag the opposite motor in operation. Timing these two motors would be by conventional means and is not discussed herein.

To carry side loads, it is imperative that the deployable boom be fixed perpendicular to boom support 14. This is accomplished by fitting the base of volute spring 10 within a circular opening existing in retaining plate 12. It is further accomplished by the use of retaining clips 32, 34 and 28. These retaining clips are of L shape consisting of both horizontal and vertical portions.

The vertical portion of each retaining clip is permanently fastened to the base of volute spring 10. This is accomplished in a conventional manner such as by welding, soldering or using nuts and bolts. The horizontal section of the retaining clip fits within a space existing between the elevated retaining plate 12 and boom support 14 as shown in FIGURES 1, 2 and 2A. Retaining clip 28 is a stationary clip and is fastened vertically as previously mentioned, and horizontally to retaining plate 12 and boom support 14 by screw 30. The remaining retaining clips 32 and 34 may be considered "floating" retaining clips. Reference is made to FIGURE 2 wherein these "floating" retaining clips 32 and 34 are illustrated.

The horizontal portions of clips 32 and 34 are not fastened to anything. This horizontal portion fits as mentioned above within a clearance that exists between retaining plate 12 and boom support 14. As the volute spring 10 is extended and retracted, its base diameter will respectively decrease and increase. As this occurs, it will be observed that the "floating" retaining clips 32 and 34 are free to move in a radial direction.

The overall result of this configuration is that the base diameter of the volute spring 10 is free to change, while at the same time maintaining itself in a perpendicular position with regard to boom support 14.

Another feature of this invention is the use of a clamp arrangement consisting of clamp 36 and lock rod 37. This clamp arrangement serves to maintain a particular base diameter of volute spring 10 as desired.

Control of the lock rod 37, which causes clamp 36 to engage or disengage, can be accomplished either manually or through the use of cams, gears or solenoids capable of external excitation. This control can be timed in conjunction with motors 24 and 26 in a conventional manner well known in the art and not shown here. As herein stated, when volute spring 10 is allowed to extend, the base diameter thereof decreases.

Engagement of clamp 36 may be accomplished by control of lock rod 37 which is made to fit within a protruding portion of clamp 36 as shown in FIGURE 1. Once this locking occurs and the circular clamp 36 allows for no change in volute spring 10 base diameter, the result is that the deployable boom becomes a rigid structure.

Another feature that occurs during the process of extension which contributes to creating a rigid deployable boom involves use of motor 26. Motor 26 locks each coil-like section of volute spring 10 within its adjacent coil-like sections and further causes gripping of each coil-like section in juxtaposition. Torque is transmitted to tie plate 18 from motor 26 as previously described. This transmission is made to occur for a period of time after extend-and-retract motor 24 ceases to operate. This lag of motor 26 beyond operation of motor 24 can be timed by conventional timing apparatus such as a timer or manually operated by, for example, a toggle switch. This incremental turning of tie plate 18 will cause the previously required clearance to disappear. The gripping of each coil-like section contributes to the rigidity of the deployable boom whereby it can then support the large axial and transverse loads.

It will be observed that prior to retraction of the deployable boom it is necessary for said base diameter to be free to increase. This is as a result of the natural property of a volute spring wherein as it is made to become shorter, the base diameter thereof automatically increases. Therefore disengagement of the clamp arrangement would be accomplished by releasing lock rod 37 and its clamp 36 by the conventional means as previously discussed.

Retraction of the deployable boom is accomplished by opposite procedure from that previously set forth for extension. Clamp 36 in conjunction with lock rod 37 is disengaged. Lock-and-release motor 26 can be turned on, for example, using a switch or automatic timer, so as to disengage the respective gripping of the coil-like sections of the volute spring 10, thereby creating the needed clearance between the sections. Extend-and-retract motor 24 is employed to cause flexible shafting 20 to begin to be wrapped around drum 22. This is accomplished manually or by tying the motors in an automatic timing sequence. As the flexible shafting 20 is wrapped around drum 22, the individual sections of the volute spring 10 are made to fit within each other. The base diameter of the volute spring increases in size up to a maximum dimension which is approximately equal to the diameter of the circular opening existing in the retainer plate 12.

There exists a rotary limit switch 21 located on extend-and-retract motor 24 so that extension and retraction may be limited to precalibrated dimensions.

Figure 3:
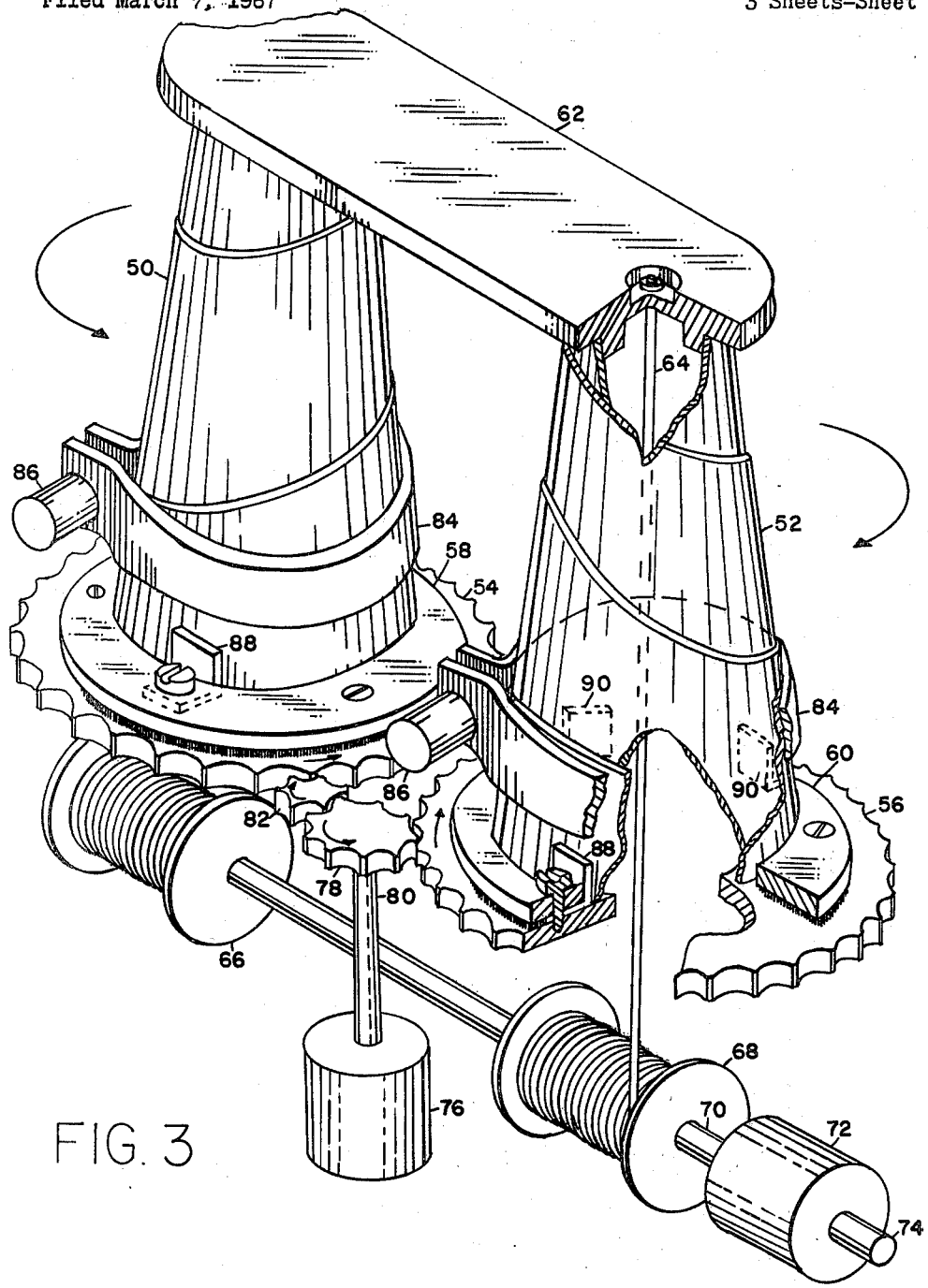
FIGURE 3 is a perspective view of a deployable boom utilizing the concept of dual volute springs, portions of which are broken away in order to indicate internal details.

Another embodiment of this invention is shown in FIGURE 3 and consists of a deployable boom which utilizes two dual counterwound volute springs 50 and 52. These are mounted side by side on two turntables 54 and 56 respectively. Two circular retaining plates 58 and 60 possess circular openings therein and are attached to turntables 54 and 56. A common tie plate 62 is attached to the top and smaller ends of both volute springs. Also attached to this tie plate are two cables such as cable 64 shown in FIGURE 3. Both cables proceed through the center of the volute springs 50 and 52 and are wrapped about two cable spools 66 and 68. These cable spools as well as an extend-and-retract motor 72 are mounted on a common shaft 70. Extend-and-retract motor 72 also possesses a rotary limit switch 74. A lock-and-release motor 76 is attached to a gear 78 by a shaft 80. The teeth of gear 78 in conjunction with the teeth of gear 82 and the respective teeth of turntables 54 and 56, result in rotational movement of the gears and turntables in the direction of the arrows indicated in FIGURE 3.

This embodiment of a deployable boom employs two clamps 84 used in conjunction with two lock rods 86 to maintain a fixed diameter at the base of volute springs 50 and 52 after extension. Stationary retainer clips 88 and "floating" retainer clips 90 are fastened to the base of each volute spring. The "floating" retainer clips 90 are allowed to move radially in the same manner as those described hereinabove for the embodiment of the deployable boom shown in FIGURE 1.

The operation of the dual spring type of deployable boom shown in FIGURE 3 is very similar to that of the single volute spring deployable boom. In most cases the common elements of the respective embodiments serve the same function. The volute springs 50 and 52 are maintained side by side and the smaller end of each is connected to common tie plate 62. Because each spring is counterwound and because each spring is made to rotate in opposite directions, the forces occurring at tie plate 62 are equal and opposite and no relative motion occurs at the tie plate. Cable spools 66 and 68 in conjunction with cable such as cable 64 control the rate of extension and retraction. As a result of operation of lock and release motor 76, the necessary clearance between each coil-like section of the springs 50 and 52 is created and maintained. The torque occurs at the base of volute springs 50 and 52 and not at the top as in the previous embodiment. This is accomplished through use of lock and release motor 76 and associated gears 78 and 82, rotation of motor 76 being in conjunction with extend-and-retract motor 72. The timing of the two motors 72 and 76 is conventional as mentioned with regard to the previous embodiment. During the process of extension, the rotating turntables 54 and 56 create sufficient torque to maintain the necessary clearance and rigidity of the volute springs. Clamp arrangements consisting of clamps 84 and associated lock rods 86 are mounted at the base of each volute spring and operate in the same fashion as previously explained.

It is to be recognized that other deployable booms utilizing more than two volute springs may be devised, containing similar harnessing and control means as that shown for the single and the dual volute spring deployable booms of FIGURES 1 and 3.

While we have described above the principles of our invention in connection with specific embodiments, it is to be clearly understood that the specification is presented by way of example and not as a limitation of the scope of our invention.

What is claimed is:

1. A deployable boom comprising:
   a volute spring structural member and
   means for extending and retracting said volute spring structural member a predetermined amount, wherein said means for extending and retracting said volute spring structural member includes:
      (A) a motor, having a shaft;
      (B) a rotatable drum coupled to said shaft;
      (C) a tie plate mounted at the top and smaller end of said volute spring structural member; and
      (D) a flexible shaft coupled to said tie plate and arranged for wrapping about said drum.

2. A deployable boom in accordance with claim 1, further including:
   (A) a clamp arranged about the base of said volute spring structural member; and
   (B) a lock rod coupled to said clamp whereby the change in base diameter of said volute spring structural member may be regulated.

3. A deployable boom in accordance with claim 1, further including means for maintaining said boom in a vertical position including:
   (A) an elevated retaining plate having a hole therein in which said volute spring structural member is mouted; and
   (B) a plurality of clips fastened to the base of said volute spring structural member, portions of said clips fitting beneath said elevated retaining plate.

4. Apparatus in accordance with claim 3, wherein one of said clips is stationary, with the remaining of said clips being "floating."

5. A deployable boom in accordance with claim 1, further including:
   a second motor;
   said flexible shaft being coupled to said second motor for rotation thereby; such that said second motor will supply rotation to said tie plate resulting in the "winding" of said volute spring structural member.

6. A deployable boom, comprising:
   (A) a plurality of volute spring structural members;
   (B) means for extending and retracting said volute spring structural members;
   (C) means for maintaining said boom in a vertical position; and
   (D) means for locking said boom, including:
      (1) a motor having a shaft,
      (2) a gear coupled to said shaft,
      (3) a second gear coupled to said first gear,
      (4) a plurality of rotating turntables upon which are mounted said volute spring structural members with teeth arranged about said turntables rotating in conjunction with said second gear whereby torque is transmitted to the base of said volute spring structural members.

7. A deployable boom in accordance with claim 6, wherein said means for extending and retracting said volute spring structural members includes:
   (A) a second motor, having a shaft;

(B) a plurality of rotatable drums coupled to said shaft;

(C) a common tie plate mounted at the top and smaller ends of said volute spring structural members; and (D) a plurality of cables coupled to said common tie plate and arranged for wrapping about said drums.

8. A deployable boom in accordance with claim 7, further including:

(A) a plurality of clamps arranged about the bases of said volute spring structural members; and (B) a plurality of lock rods coupled to said clamps whereby the change in base diameters of said volute spring structural members may be regulated.

9. A deployable boom in accordance with claim 6 wherein said means for maintaining said boom in a vertical position includes:

(A) a plurality of elevated retaining plates having holes therein in which said volute spring structural members are mounted; and (B) a plurality of clips fastened to the base of each of said volute spring structural members, portions of said clips fitting beneath said elevated retaining plates.

10. Apparatus in accordance with claim 9, wherein one of each set of clips fastened to the base of a volute spring structural member is stationary, with the remaining clips being "floating."

References Cited

UNITED STATES PATENTS

| | | | |
|---|---|---|---|
| 144,600 | 11/1873 | Bussell | 267—62 |
| 179,257 | 6/1876 | Birk | 267—62 |
| 291,009 | 12/1883 | Williams. | |
| 1,042,320 | 10/1912 | Chapman | 267—62 |
| 2,410,290 | 10/1946 | Keysor | 267—62 |
| 2,597,650 | 5/1952 | Maehren. | |
| 2,796,952 | 6/1957 | Brumby | 187—8.56 |

FOREIGN PATENTS

| | | |
|---|---|---|
| 398,947 | 1/1909 | France. |
| 1,180,366 | 7/1957 | France. |
| 104,513 | 8/1917 | Great Britain. |
| 319,475 | 9/1929 | Great Britain. |

HARVEY C. HORNSBY, Primary Examiner

U.S. Cl. X.R.

182—142; 185—35; 187—17; 267—1, 62